United States Patent
Zhu et al.

(10) Patent No.: US 12,536,247 B2
(45) Date of Patent: Jan. 27, 2026

(54) ROUGHNESS COMPENSATION METHOD AND SYSTEM, IMAGE PROCESSING DEVICE, AND READABLE STORAGE MEDIUM

(71) Applicant: Suzhou Cleva Precision Machinery & Technology Co., Ltd., Suzhou (CN)

(72) Inventors: Shaoming Zhu, Suzhou (CN); Xue Ren, Suzhou (CN)

(73) Assignee: Suzhou Cleva Precision Machinery & Technology Co., Ltd., Jiangsu Province (CN)

( * ) Notice: Subject to any disclaimer, the term of this patent is extended or adjusted under 35 U.S.C. 154(b) by 424 days.

(21) Appl. No.: 18/245,942

(22) PCT Filed: Oct. 28, 2020

(86) PCT No.: PCT/CN2020/124308
§ 371 (c)(1),
(2) Date: Mar. 20, 2023

(87) PCT Pub. No.: WO2022/062048
PCT Pub. Date: Mar. 31, 2022

(65) Prior Publication Data
US 2023/0385987 A1  Nov. 30, 2023

(30) Foreign Application Priority Data
Sep. 24, 2020 (CN) .................. 202011013414.X

(51) Int. Cl.
*G06F 17/16* (2006.01)
*G06F 17/18* (2006.01)
(Continued)

(52) U.S. Cl.
CPC ............ *G06F 17/16* (2013.01); *G06T 5/40* (2013.01); *G06T 7/11* (2017.01); *G06T 7/136* (2017.01)

(58) Field of Classification Search
CPC . G06F 17/16; G06F 17/18; G06T 5/40; G06T 7/11; G06T 7/136;
(Continued)

(56) References Cited

U.S. PATENT DOCUMENTS 10,210,664 B1 * 2/2019 Chaturvedi ........ G06Q 30/0643
2004/0086175 A1 * 5/2004 Parker .................. G06T 11/008
382/128

(Continued)

FOREIGN PATENT DOCUMENTS

| CN | 102034230 A | 4/2011 |
| CN | 105303543 A | 2/2016 |

(Continued)

OTHER PUBLICATIONS

International Search Report for International Application No. PCT/CN2020/124308, dated Mar. 30, 2021.

*Primary Examiner* — Chineyere Wills-Burns
*Assistant Examiner* — Lucius Cameron Gree Allen
(74) *Attorney, Agent, or Firm* — JK Intellectual Property Law, PA

(57) ABSTRACT

Disclosed are a roughness compensation method and system, an image processing device, and a readable storage medium. The roughness compensation method includes the following steps: acquiring a roughness value of a target region in an image and position information of pixels in the target region; averaging the position information of the pixels in the target region to obtain average position information; determining whether the average position information is located in a preset compensation region; and com-
(Continued)

pensating and updating the roughness value when the average position information is located in the preset compensation region; or skipping compensating the roughness value when the average position information is not located in the preset compensation region. In the present disclosure, a determination result of whether the average position information is located in a preset compensation region is used as a basis of compensation, and a compensated roughness value is used for an image processing program such as shadow recognition, which can effectively reduce erroneous determination of shadow recognition results.

7 Claims, 6 Drawing Sheets

(51) Int. Cl.
| | |
|---|---|
| *G06T 5/40* | (2006.01) |
| *G06T 5/77* | (2024.01) |
| *G06T 7/11* | (2017.01) |
| *G06T 7/12* | (2017.01) |
| *G06T 7/136* | (2017.01) |
| *G06T 7/40* | (2017.01) |
| *G06T 7/73* | (2017.01) |
| *G06T 7/90* | (2017.01) |

(58) Field of Classification Search
CPC .. G06T 2207/30188; G06T 2207/10024; G06T 2207/20021; G06T 7/40; G06T 7/12; G06T 7/73; G06T 7/90; G06T 5/77
USPC .......................................................... 382/100
See application file for complete search history.

(56) References Cited

U.S. PATENT DOCUMENTS

| | | | |
|---|---|---|---|
| 2010/0328390 A1* | 12/2010 | Bannai ............... B41J 29/393 |
| | | | 347/14 |
| 2014/0177955 A1* | 6/2014 | Srinivasan ........... G06V 10/56 |
| | | | 382/165 |
| 2015/0206312 A1* | 7/2015 | Luo ....................... G06T 7/11 |
| | | | 382/173 |
| 2015/0287185 A1* | 10/2015 | Grass ................. G06T 7/0012 |
| | | | 382/131 |
| 2017/0061635 A1* | 3/2017 | Oberheu .............. G06T 7/586 |
| 2020/0380659 A1* | 12/2020 | Lin ..................... G06V 10/245 |

FOREIGN PATENT DOCUMENTS

| | | |
|---|---|---|
| CN | 107154026 A | 9/2017 |
| CN | 111047698 A | 4/2020 |
| CN | 111445410 A | 7/2020 |

* cited by examiner

ROUGHNESS COMPENSATION METHOD AND SYSTEM, IMAGE PROCESSING DEVICE, AND READABLE STORAGE MEDIUM

CROSS-REFERENCE TO RELATED PATENT APPLICATIONS

This application is a national stage of International Application No. PCT/CN2020/124308, filed on Oct. 28, 2020, which claims priority to CN patent application No. 202011013414.X, filed on Sep. 24, 2020. All of the aforementioned applications are hereby incorporated by reference in their entireties.

TECHNICAL FIELD

The present disclosure relates to a roughness compensation method and system, an image processing device, and a readable storage medium, in particular to a roughness compensation method and system, an image processing device, and a readable storage medium that effectively reduce erroneous determination of a shadow.

BACKGROUND

At present, commonly used shadow detection methods are divided into two types: methods based on geometric models and methods based on shadow features. The methods based on geometric models, which build a shadow model by using prior information of a scenario, a moving object, and lighting conditions, are usually used in specific scenarios. The methods based on shadow features identify a shadow region by using information of a shadow, such as geometric characteristics, brightness, color, and texture (roughness), where the color and the texture (roughness) are two most widely used properties at present.

Due to the influence of a shooting angle, pixels, far away from a shooting apparatus, at one end of an image are lost to some extent. If a roughness value is acquired according to a pixel missing image, and then shadow recognition is performed according to the acquired roughness value, shadow recognition results are erroneously determined.

SUMMARY

The present disclosure provides a roughness compensation method and system, an image processing device, and a readable storage medium that effectively reduce erroneous determination.

The present disclosure provides a roughness compensation method. The method includes the following steps:
  acquiring a roughness value of a target region in an image and position information of pixels in the target region;
  averaging the position information of the pixels in the target region to obtain average position information;
  determining whether the average position information is located in a preset compensation region; and
  compensating and updating the roughness value when the average position information is located in the preset compensation region; or
  skipping compensating the roughness value when the average position information is not located in the preset compensation region.

Optionally, the position information of the pixels is determined by a preset coordinate system of the image, the preset coordinate system includes an X coordinate axis and a Y coordinate axis, the X coordinate axis and the Y coordinate axis are parallel to boundaries of the image respectively, the position information of the pixels is about Y coordinate values of the pixels, and the Y coordinate values of the pixels indicate distances between the pixels and a shooting apparatus.

Optionally, the average position information is an average value of the Y coordinate values of the pixels in the target region, and the preset compensation region is a region far away from the shooting apparatus in the image.

Optionally, before acquiring a roughness value of a target region in an image and position information of pixels in the target region, the method includes dynamically segmenting the image into a plurality of target regions according to a chrominance component of the image and a preset chrominance interval, the target regions including a first region and a second region.

Optionally, the dynamically segmenting the image into a plurality of target regions according to a chrominance component of the image and a preset chrominance interval includes:
  obtaining a chrominance component of an image;
  generating a chrominance component histogram according to the chrominance component;
  determining peaks and troughs in the chrominance component histogram according to the preset chrominance interval and preset peak and trough setting conditions;
  obtaining a segmentation threshold according to the peaks and the troughs; and
  segmenting the image into a first region and a second region according to the preset chrominance interval and the segmentation threshold, where a chrominance value corresponding to one of the first region and the second region is within a range of the segmentation threshold, and a chrominance value corresponding to the other region of the first region and the second region is within a range of the preset chrominance interval and is not within the range of the segmentation threshold.

Optionally, when the target region is the first region, the acquiring a roughness value of a target region in an image and position information of pixels in the target region includes acquiring a first roughness value of the first region in the image and first position information of pixels in the first region; and the compensating and updating the first roughness value when the average position information is located in the preset compensation region includes compensating by multiplying the first roughness value with a first preset compensation coefficient and updating the first roughness value when first average position information is located in the preset compensation region, where the first preset compensation coefficient is a constant.

Optionally, when the target region is the second region, the acquiring a roughness value of a target region in an image and position information of pixels in the target region includes acquiring a second roughness value of the second region in the image and second position information of pixels in the second region; and the compensating and updating the roughness value when the average position information is located in the preset compensation region includes compensating by multiplying the second roughness value with a second preset compensation coefficient and updating the second roughness value when the average position information is located in the preset compensation region, where the second preset compensation coefficient is a constant.

The present disclosure further provides a roughness compensation system. The system includes:

an information acquisition module, configured to acquire a roughness value of a target region in an image and position information of pixels in the target region;

a position information processing module, configured to average the position information of the pixels in the target region to obtain average position information; and a roughness compensation module, configured to determine whether the average position information is located in a preset compensation region; and compensate and update the roughness value when the average position information is located in the preset compensation region; or skip compensating the roughness value when the average position information is not located in the preset compensation region.

The present disclosure further provides an image processing device, including a memory and a processor, the memory storing a computer program, where the steps of the roughness compensation method are implemented when the processor executes the computer program.

The present disclosure further provides a readable storage medium, storing a computer program, where the steps of the roughness compensation method are implemented when the computer program is executed by a processor.

Compared with the prior art, the present disclosure has advantages that a determination result of whether the average position information is located in a preset compensation region is used as a basis of compensation, and a compensated roughness value is used for an image processing program such as shadow recognition, which can effectively reduce erroneous determination of shadow recognition results. In the present disclosure, the segmentation threshold is obtained according to the peaks and the troughs, the segmentation threshold is dynamically adjusted according to different images, and a fixed segmentation threshold is not used, thereby effectively reducing erroneous segmentation.

DETAILED DESCRIPTION

Figure 1:
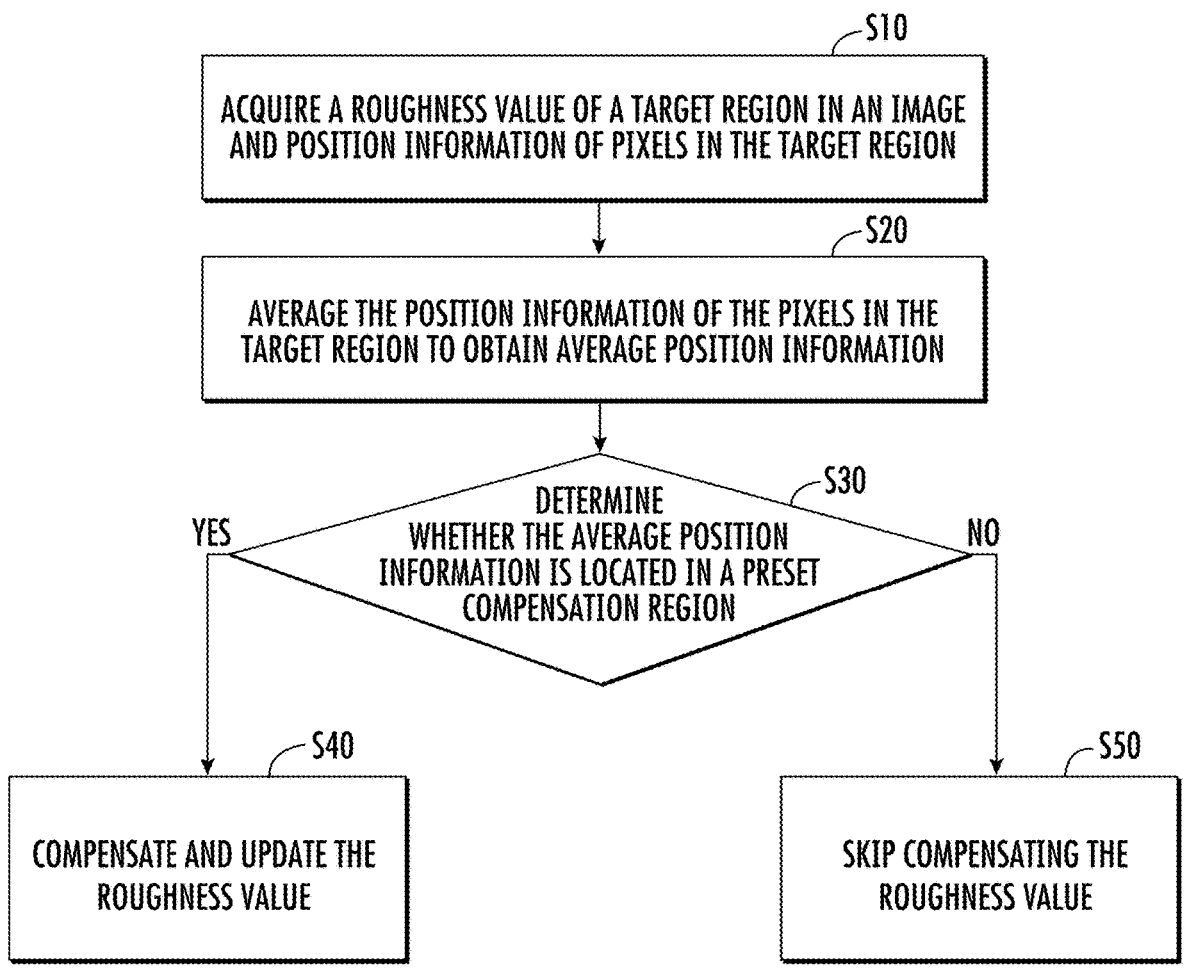
FIG. 1 is a flowchart of a first embodiment of a roughness compensation method in the present disclosure.

To make a person skilled in the art understand the technical solutions in the present disclosure better, the following clearly and completely describes the technical solutions in the embodiments of the present disclosure with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

With reference to FIG. 1 to FIG. 8, the present disclosure provides a roughness compensation method. The method includes the following steps:

Step S10: Acquire a roughness value of a target region in an image and position information of pixels in the target region;

Step S20: Average the position information of the pixels in the target region to obtain average position information;

Step S30: Determine whether the average position information is located in a preset compensation region; when the average position information is located in the preset compensation region, perform step S40; when the average position information is not located in the preset compensation region, perform step S50; and Step S40: Compensate and update the roughness value; or Step S50: Skip compensating the roughness value.

In another embodiment of the present disclosure, the position information of the pixels in step S10 is determined by a preset coordinate system of the image, the preset coordinate system includes an X coordinate axis and a Y coordinate axis, the X coordinate axis and the Y coordinate axis are parallel to boundaries of the image respectively, the position information of the pixels is about Y coordinate values of the pixels, and the Y coordinate values of the pixels indicate distances between the pixels and a shooting apparatus. Assuming that the image is rectangular, one of boundary intersections of the image is a coordinate origin of the preset coordinate system, and the X coordinate axis and the Y coordinate axis intersect at the coordinate origin, a numerical range of the preset compensation region is set according to extension directions of the X coordinate axis and the Y coordinate axis. Different preset coordinate systems correspond to the Y coordinate values of the pixels and the numerical range of the preset compensation region.

In another embodiment of the present disclosure, the average position information is an average value of the Y coordinate values of the pixels in the target region, and the preset compensation region is a region far away from the shooting apparatus in the image.

In another embodiment of the present disclosure, before step S10, the method includes dynamically segmenting the image into a plurality of target regions according to a chrominance component of the image and a preset chrominance interval, the target regions including a first region and a second region.

In another embodiment of the present disclosure, the present disclosure provides a roughness compensation method, including the following steps:

Step S105: Dynamically segment an image into a first region and a second region according to a chrominance component of the image and a preset chrominance interval;

Step S110: Acquire a first roughness value of the first region in the image and first position information of pixels in the first region;

Step S120: Acquire a second roughness value of the second region in the image and second position information of pixels in the second region;

Step S210: Average the position information of the pixels in the first region to obtain first average position information ia;

Step S220: Average the position information of the pixels in the second region to obtain second average position information ib;

Step S310: Determine whether the first average position information is located in a preset compensation region; when the first average position information is located in the preset compensation region, perform step S410; when the first average position information is not located in the preset compensation region, perform step S510;

Step S320: Determine whether the second average position information is located in a preset compensation region; when the second average position information is located in the preset compensation region, perform step S420; when the second average position information is not located in the preset compensation region, perform step S520;

Step S410: Compensate by multiplying the first roughness value with a first preset compensation coefficient, and update the first roughness value, where the first preset compensation coefficient is a constant;

Step S420: Compensate by multiplying the second roughness value with a second preset compensation coefficient, and update the second roughness value, where the second preset compensation coefficient is a constant;

Step S510: Skip compensating the first roughness value; and

Step S520: Skip compensating the second roughness value.

The average position information <25 is assumed to represent that the average position information is located in the preset compensation region. When ia<25, it represents that the first average position information is located in the preset compensation region, and step S410 needs to be performed; otherwise, it represents that the first average position information is not located in the preset compensation region, and step S510 needs to be performed. Similarly, when ib<25, it represents that the second average position information is located in the preset compensation region, and step S420 needs to be performed; otherwise, it represents that the second average position information is not located in the preset compensation region, and step S520 needs to be performed.

In another embodiment of the present disclosure, the second preset compensation coefficient is different from the first preset compensation coefficient, for example, the first preset compensation coefficient is 3, and Sa=3*Sa; and the second preset compensation coefficient is 4, and Sb=4*Sb. Values of the second preset compensation coefficient and the first preset compensation coefficient may be adjusted according to compensation effects.

Figure 2:
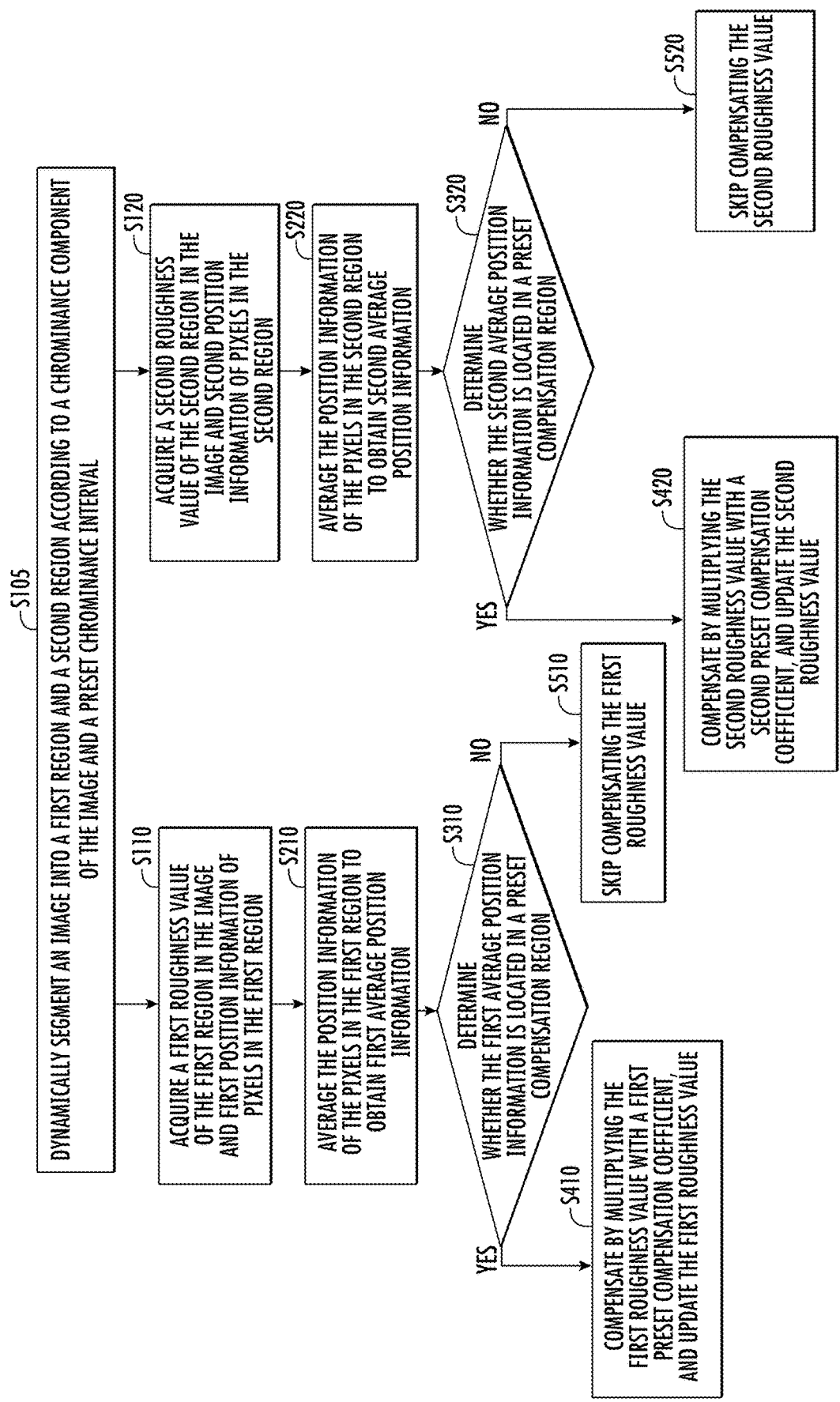
FIG. 2 is a flowchart of a second embodiment of a roughness compensation method in the present disclosure.
Figure 3:
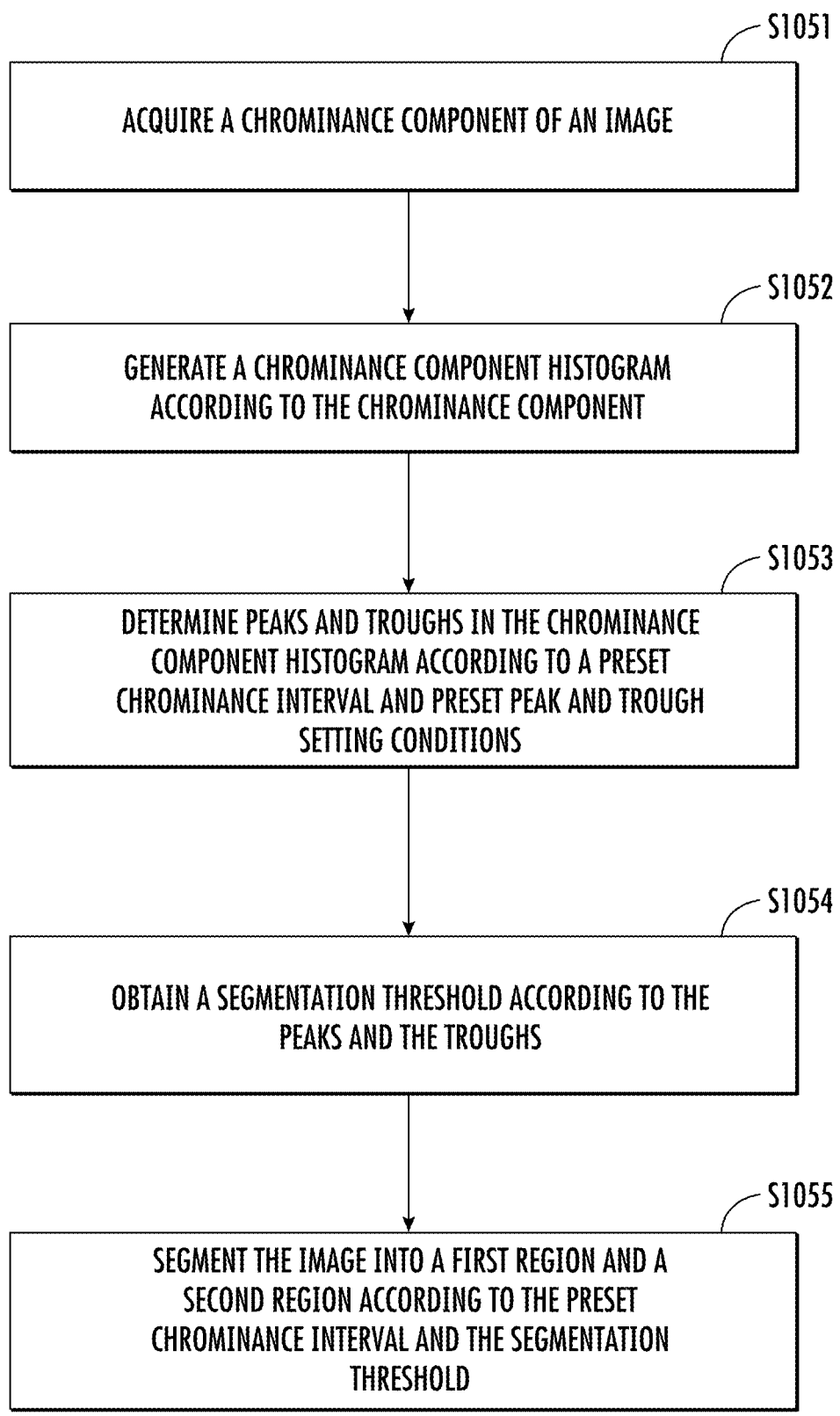
FIG. 3 is a flowchart of step S105 in FIG. 2.
Figure 4:
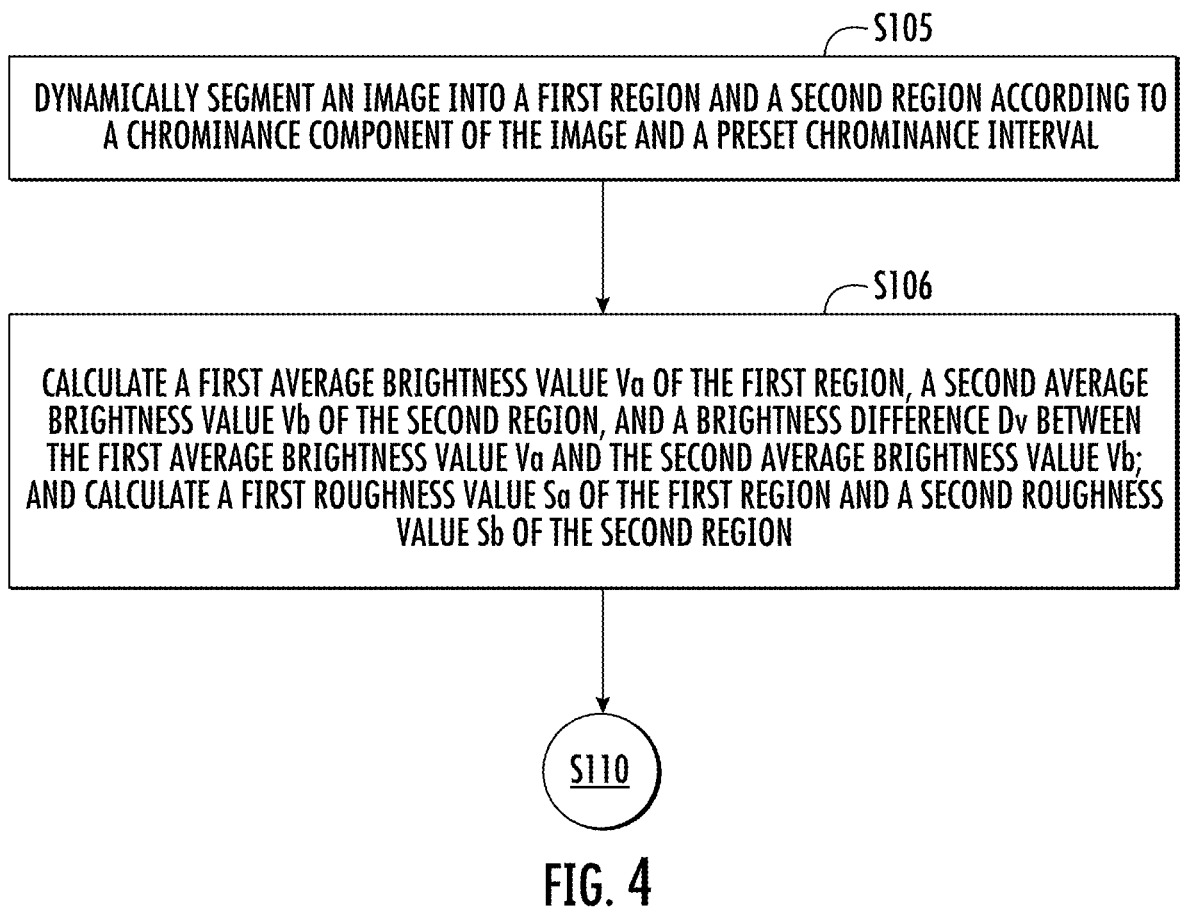
FIG. 4 is a flowchart of a third embodiment of a roughness compensation method in the present disclosure.
Figure 5:
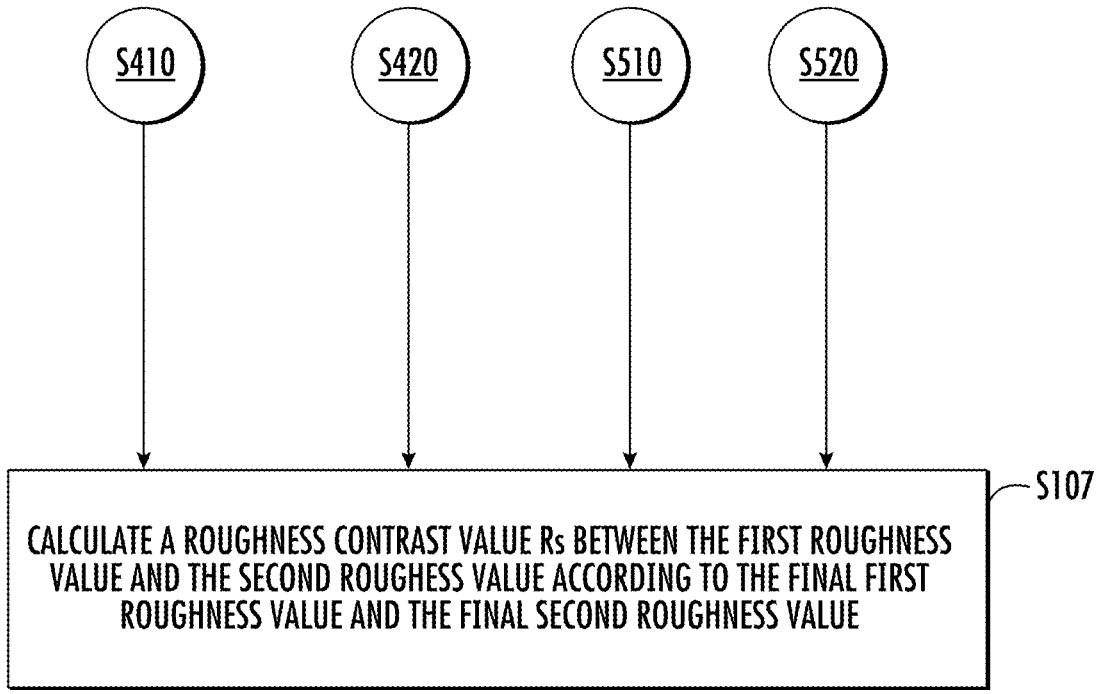
FIG. 5 is a flowchart of a fourth embodiment of a roughness compensation method in the present disclosure.
Figure 6:
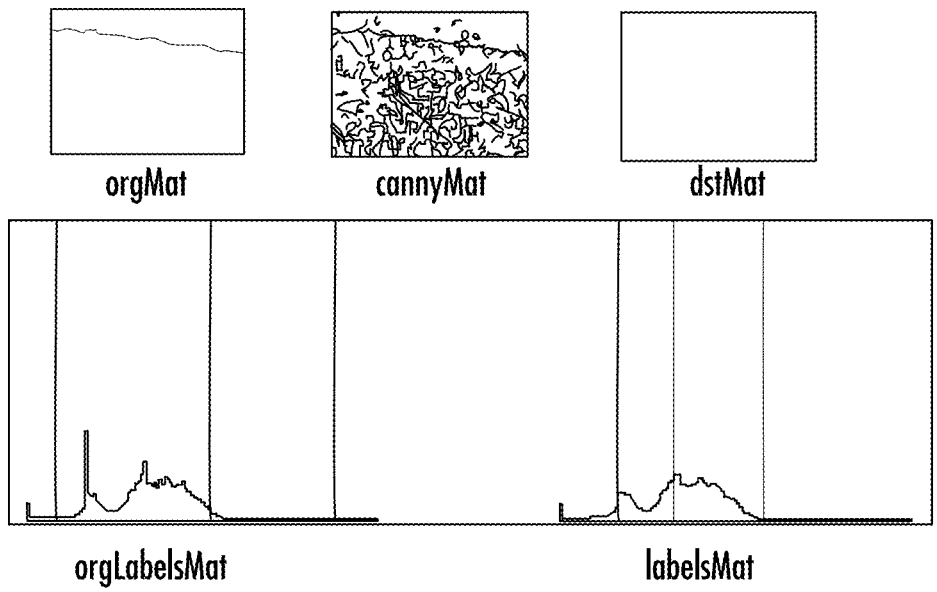
FIG. 6 shows an edge image, a segmentation result diagram and eigenvalues of a first image.
Figure 7:
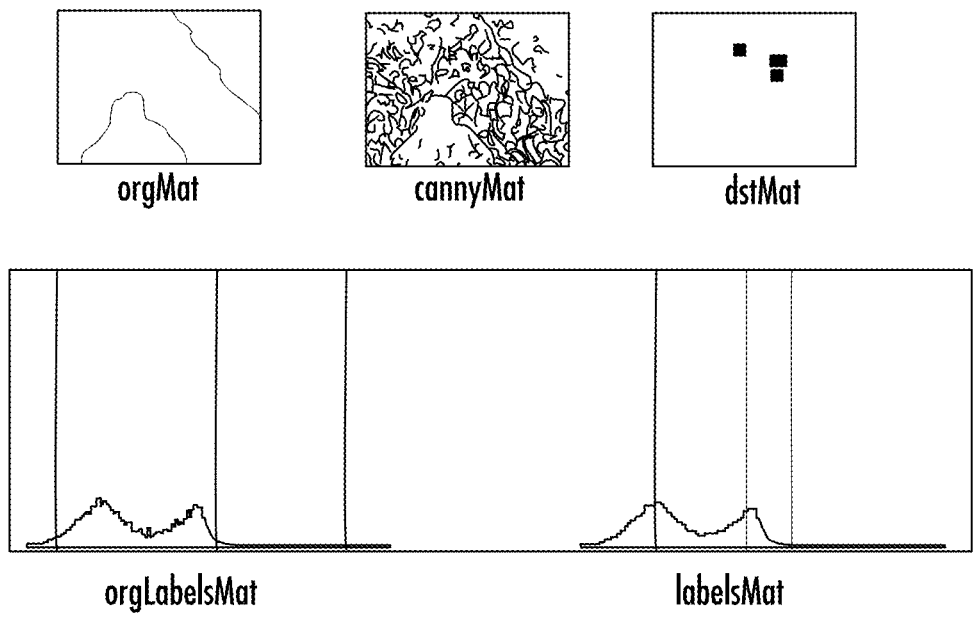
FIG. 7 shows an edge image, a segmentation result diagram and eigenvalues of a second image.
Figure 8:
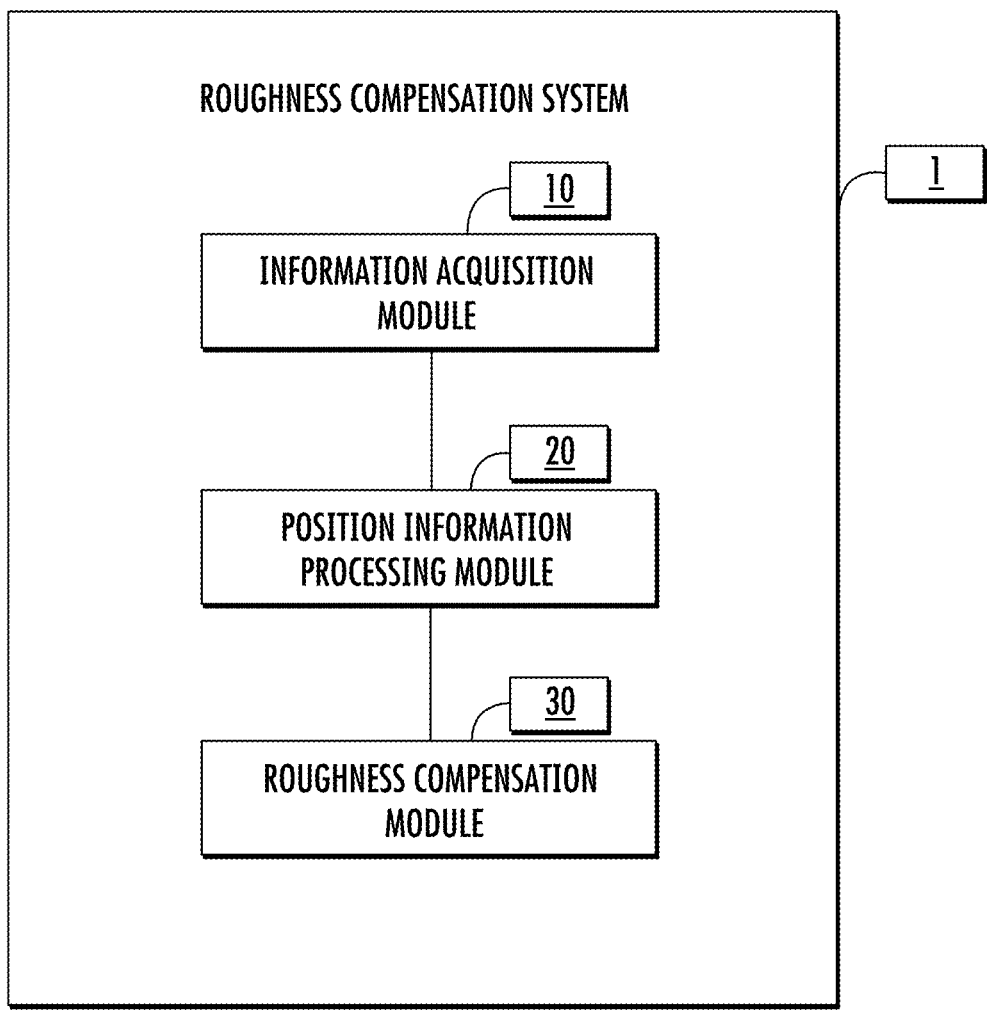
FIG. 8 is a schematic block diagram of a roughness compensation system in the present disclosure.

With reference to FIG. 2, in another embodiment of the present disclosure, step 105 includes the following steps:

Step S1051: Acquire a chrominance component of an image;

Step S1052: Generate a chrominance component histogram according to the chrominance component;

Step S1053: Determine peaks and troughs in the chrominance component histogram according to a preset chrominance interval and preset peak and trough setting conditions;

Step S1054: Obtain a segmentation threshold according to the peaks and the troughs; and Step S1055: Segment the image into a first region and a second region according to the preset chrominance interval and the segmentation threshold, where a chrominance value corresponding to one of the first region and the second region is within a range of the segmentation threshold, and a chrominance value corresponding to the other region of the first region and the second region is within a range of the preset chrominance interval and is not within the range of the segmentation threshold.

The chrominance component in step S1051 may be obtained directly or indirectly. A chrominance component in an HSV image may be obtained directly after separation, and a chrominance component of an RGB image may be obtained after processing such as color space conversion.

In another embodiment of the present disclosure, step S1051 includes:

acquire an image orgMat; and separate the image orgMat to obtain an H channel image and a chrominance component.

The obtained chrominance component comes from the HSV image, where the HSV image includes the chrominance component, a luminance component, and a saturation component.

In another embodiment of the present disclosure, step S1051 includes:

obtain an original image, the original image including a first color space; and convert the original image from a first color space to an HSV color space to obtain a chrominance component.

The original image comes from a different source and has a different format. The original image is converted according to the format of the original image to obtain the chrominance component. For example, the first color space may be an RGB color space. The original image is then converted from the RGB color space to the HSV color space.

In another embodiment of the present disclosure, step S1052 includes:

generate a first chrominance component histogram orgLabelsMat according to the chrominance component; and filter and smooth the first chrominance component histogram orgLabelsMat to obtain a second chrominance component histogram labelsMat.

In another embodiment of the present disclosure, the preset chrominance interval in step S1053 may be determined according to needs, and different preset chrominance intervals are set for different use scenarios. For example, the preset chrominance interval may be set to 15-95 for a scenario that an image is segmented by the image segmentation method based on a chrominance component in the present disclosure for lawn recognition.

In another embodiment of the present disclosure, the preset peak and trough setting conditions in step S1053 include:

Preset peak and trough setting condition 1: a peak frequency >k*a trough frequency, where k is a constant, including a positive integer, a fraction, a decimal, or the like;

Preset peak and trough setting condition 2: the distance between adjacent peaks conforms to a preset distance between peaks; and Preset peak and trough setting condition 3: the peak frequency >a frequency threshold.

The peaks and the troughs in the chrominance component histogram are determined only when the preset peak and trough setting conditions 1, 2, and 3 are simultaneously satisfied. If the preset peak and trough setting condition 1 and 3 are satisfied, but the preset peak and trough setting condition 2 is not satisfied, peaks with maximum peak frequencies are selected as the peaks in the chrominance component histogram, and the remaining peaks are not regarded as the peaks in the chrominance component histogram.

In another embodiment of the present disclosure, step S1054 includes:

count a quantity of the peaks j;
determine whether the quantity of the peaks j is not less than 2; and if the quantity of the peaks j is not less than 2, perform step S403; or if the quantity of the peaks j is less than 2, perform step S404; and
obtain the segmentation threshold by a peak and trough segmentation method; or
obtain the segmentation threshold by an OTSU threshold method.

In another embodiment of the present disclosure, the obtaining the segmentation threshold by a peak and trough segmentation method includes:

find a group of peak and trough with a maximum peak-trough ratio from the peaks and the troughs as a target peak and a target trough, and obtain a position of the trough in the target peak and the target trough as a first position;
find, from a left side of the first position, a second position where a maximum peak and a maximum trough on the left side are located, find, from a right side of the first position, a third position where a maximum peak and a maximum trough on the right side are located, obtain a chrominance value corresponding to the second position as a second peak chrominance value $h1i$, and obtain a chrominance value corresponding to the third position as a third peak chrominance value $h2i$;
find a chrominance value corresponding to a minimum frequency between the second position and the third position as a segmentation chrominance value li; and
obtain the segmentation threshold [lowValue, highValue] corresponding to regions with different chrominances according to the second peak chrominance value $h1i$, the third peak chrominance value $h2i$, and the segmentation chrominance value li. The second peak chrominance value $h1i$ is compared with a second preset peak threshold and the third peak chrominance value $h2i$ is compared with a third preset peak threshold to obtain peak chrominance value comparison results, and the segmentation threshold corresponding to regions with different chrominances is obtained according to the peak chrominance value comparison results.

When the peak chrominance value comparison results satisfy "the second peak chrominance value $h1i$>the second preset peak threshold, and the third peak chrominance value $h2i$>the third preset peak threshold", a minimum value of the preset chrominance interval (or another value of the preset chrominance interval) is set as a minimum value lowValue of the segmentation threshold, and the segmentation chrominance value li is set as a maximum value highValue of the segmentation threshold.

When the peak chrominance value comparison results do not satisfy "the second peak chrominance value $h1i$>the second preset peak threshold, and the third peak chrominance value $h2i$>the third preset peak threshold", the segmentation chrominance value li is set as a minimum value lowValue of the segmentation threshold, and a maximum value of the preset chrominance interval (or another value of the preset chrominance interval) is set as a maximum value highValue of the segmentation threshold.

For example, the preset chrominance interval [15, 95], the second preset peak threshold=30, and the third preset peak threshold=75. If $h1i$>30 and $h2i$>75 (a large peak is bluish), lowValue=15 and highValue=li; otherwise, lowValue=li and highValue=95.

In another embodiment of the present disclosure, if the quantity of the peaks j is less than 2, the segmentation chrominance value li is obtained by an OTSU threshold method, and the segmentation threshold [lowValue, highValue] corresponding to regions with different chrominances is obtained according to the quantity of the peaks.

In order to accurately segment a region with a specific chrominance in the preset chrominance interval in the image, a lowest demarcation point is searched from the minimum value of the preset chrominance interval, and if the lowest demarcation point exists, the second peak chrominance value and the third peak chrominance value are preset according to a first preset rule; or if there is no lowest demarcation point, the second peak chrominance value and the third peak chrominance value are preset according to a second preset rule. A chrominance value of the lowest demarcation point is mi, and a frequency corresponding to mi is greater than frequencies corresponding to mi+1 and mi+2. Segmentation of a lawn image is used as an example, where chrominance values of some grasses in the lawn are located in a yellow-red chrominance range (specific chrominance). By searching for a lowest demarcation point, yellow-red degree grasses can be prevented from being segmented into a non-grass region.

If the lowest demarcation point exists, the second peak chrominance value and the third peak chrominance value are preset according to the quantity of the peaks and the first preset rule. When the quantity of the peaks is 0, the second peak chrominance value $h1i$ is set as the chrominance value mi of the lowest demarcation point, and the third peak chrominance value $h2i$ is set as the maximum value of the preset chrominance interval (or another value of the preset chrominance interval). When the quantity of the peaks is 1, the chrominance value of the peak is h1, the second peak chrominance value $h1i$ is set as the chrominance value of the lowest demarcation point, and the third peak chrominance value is set as the h1.

If the lowest demarcation point does not exist, the second peak chrominance value $h1i$ and the third peak chrominance value $h2i$ are preset according to the quantity of the peaks and the second preset rule. When the quantity of the peaks is 0, the second peak chrominance value $h1i$ is set as the minimum value of the preset chrominance interval (or another value of the preset chrominance interval), and the third peak chrominance value $h2i$ is set as the maximum value of the preset chrominance interval (or another value of the preset chrominance interval). When the quantity of the peaks is 1, the chrominance value of the peaks is h1, the second peak chrominance value $h1i$ is set as the h1, and the third peak chrominance value is set as the h1.

When the quantity of the peaks is 0, the segmentation chrominance value li, the second peak chrominance value $h1i$, and the third peak chrominance value $h2i$ are compared to obtain a peak chrominance value comparison result, and the segmentation threshold corresponding to regions with different chrominances is obtained according to the peak chrominance value comparison result.

When the quantity of the peaks is 0, the comparison result includes:

1-1 When the peak chrominance value comparison result satisfies "the segmentation chrominance value li>the third peak chrominance value $h2i$", the segmentation chrominance value li is set as the minimum value lowValue of the segmentation threshold, and the maximum value of the preset chrominance interval (or another value of the preset chrominance interval) is set as the maximum value highValue of the segmentation threshold.

1-2 When the peak chrominance value comparison result satisfies "the segmentation chrominance value li<the second peak chrominance value h1$i$", the minimum value of the preset chrominance interval (or another value of the preset chrominance interval) is set as the minimum value lowValue of the segmentation threshold, and the segmentation chrominance value li is set as the maximum value highValue of the segmentation threshold.

1-3 When the peak chrominance value comparison result satisfies "the second peak chrominance value h1$i$ the segmentation chrominance value li the third peak chrominance value h2$i$", the second peak chrominance value h1$i$ is set as the minimum value lowValue of the segmentation threshold, and the third peak chrominance value h2$i$ is set as the maximum value highValue of the segmentation threshold.

When the quantity of the peaks is 1, the second peak chrominance value h1$i$ is compared with the second preset peak threshold and the third peak chrominance value h2$i$ is compared with the third preset peak threshold to obtain peak chrominance value comparison results, and the segmentation threshold corresponding to regions with different chrominances is obtained according to the peak chrominance value comparison results. The comparison at 1 peak is the same as the comparison at j peaks (j is not less than 2). The segmentation threshold [lowValue, highValue] corresponding to regions with different chrominances is obtained according to the second peak chrominance value h1$i$, the third peak chrominance value h2$i$, and the segmentation chrominance value li. The second peak chrominance value h1$i$ is compared with a second preset peak threshold and the third peak chrominance value h2$i$ is compared with a third preset peak threshold to obtain peak chrominance value comparison results, and the segmentation threshold corresponding to regions with different chrominances is obtained according to the peak chrominance value comparison results.

In another embodiment of the present disclosure, after step S105, the method further includes:

Step S106: Calculate a first average brightness value Va of the first region, a second average brightness value Vb of the second region, and a brightness difference Dv between the first average brightness value Va and the second average brightness value Vb; and calculate a first roughness value Sa of the first region and a second roughness value Sb of the second region.

The first roughness value Sa and the second roughness value Sb in step S106 are used as data sources in step S110 and step S120.

The calculating a first roughness value Sa of the first region and a second roughness value Sb of the second region includes the following steps:

acquire an image orgMat;
separate the image orgMat to obtain a V channel image, the V channel image including a brightness component;
pre-process the V channel image to obtain a pre-processed image, the pre-processing including filtering and normalization;
perform edge extraction on the pre-processed image to obtain an edge image cannyMat; and
calculate the first roughness value Sa of the first region and the second roughness value Sb of the second region in the edge image cannyMat.

A final first roughness value and a final second roughness value are obtained after the roughness compensation method is performed on the first roughness value and the second roughness value in steps S110 and S120, and a roughness contrast value Rs between the first roughness value and the second roughness value is calculated according to the final first roughness value and the final second roughness value in step S107.

Eigenvalues obtained from steps S106 and S107 include the first average brightness value of the first region, the second average brightness value of the second region, the brightness difference between the first average brightness value and the second average brightness value, the first roughness value of the first region, the second roughness value of the second region, or the roughness contrast value between the first roughness value and the second roughness value, and each of the eigenvalues is set with a corresponding preset threshold, where comparing the eigenvalues with the preset thresholds to determine whether the image has a shadow includes comparing each eigenvalue with the corresponding preset threshold, and determining, according to any or a combination of comparison results, whether the image has a shadow.

In the determining, according to any or a combination of comparison results, whether the image has a shadow, the combination of eigenvalues for determining the shadow may be set according to needs. For example, combinations of some eigenvalues are used as determination bases:

Determination basis 1: h1$i$>34 and h2$i$<75 (a color region is in a green range), and dv>45
Determination basis 2: Vb<50 and Dv>40
Determination basis 3: Rs<2, Dv>35 and Sa>0.1

The image processing of shadow recognition includes a plurality of determination bases, each of which includes any or a combination of eigenvalues. If any determination basis or a plurality of determination bases are satisfied, the image has a shadow. If any determination basis is not satisfied, the image has no shadow.

When the image has a shadow, the image is segmented through a preset fixed segmentation threshold (for example, [15, 95]) to obtain a final segmentation result dstMat. When the image has no shadow, the image is segmented through a dynamic segmentation threshold [lowValue, highValue] to obtain a final segmentation result dstMat.

The present disclosure further provides a roughness compensation system 1. The system includes:

an information acquisition module 10, configured to acquire a roughness value of a target region in an image and position information of pixels in the target region;
a position information processing module 20, configured to average the position information of the pixels in the target region to obtain average position information; and
a roughness compensation module 30, configured to determine whether the average position information is located in a preset compensation region; and compensate and update the roughness value when the average position information is located in the preset compensation region; or skip compensating the roughness value when the average position information is not located in the preset compensation region.

The present disclosure further provides an image processing device, including a memory and a processor, the memory storing a computer program, where the steps of the roughness compensation method are implemented when the processor executes the computer program. The image processing device may be a lawn mower or another intelligent traveling device. The lawn mower or other intelligent traveling device is equipped with a shooting apparatus. The shooting apparatus captures an image in front of a traveling direction, for example, an image of a front lawn. The image includes a region close to the image processing device and a region far away from the image processing device. In a process of processing the image, if average position information of a target region is located in a preset compensation region (the region far away from the image processing device is set as the preset compensation region), compensation is required. A compensated roughness value is closer to a true roughness value, which is conducive to subsequent shadow recognition.

The present disclosure further provides a readable storage medium, storing a computer program, where the steps of the roughness compensation method are implemented when the computer program is executed by a processor.

To sum up, in the present disclosure, a determination result of whether the average position information is located in a preset compensation region is used as a basis of compensation, and the compensated roughness value is used for an image processing program such as shadow recognition, which can effectively reduce erroneous determination of shadow recognition results. In the present disclosure, the segmentation threshold is obtained according to the peaks and the troughs, the segmentation threshold is dynamically adjusted according to different images, and a fixed segmentation threshold is not used, thereby effectively reducing erroneous segmentation.

In addition, it should be understood that, although this specification is described according to the embodiments, but not every embodiment includes only one independent technical solution. The description of the specification is only for the sake of clarity, and a person skilled in the art should regard the specification as a whole. The technical solutions in the embodiments can be properly combined to form other embodiments that can be understood by the person skilled in the art.

A series of detailed descriptions set forth above are merely specific descriptions directed to the feasible embodiments of the present disclosure, and are not intended to limit the protection scope of the present disclosure. Any equivalent embodiment or alteration made without departing from the spirit of the present disclosure shall fall within the protection scope of the present disclosure.

The invention claimed is:

1. A roughness compensation method comprising the following steps:
   acquiring a roughness value of a target region in an image and a position information of pixels in the target region;
   averaging the position information of the pixels in the target region to obtain an average position information;
   determining whether the average position information is located in a preset compensation region; and either
   compensating and updating the roughness value when the average position information is located in the preset compensation region; or
   skipping compensating and updating the roughness value when the average position information is not located in the preset compensation region,
   wherein before acquiring a roughness value of a target region in an image and a position information of pixels in the target region, the method comprises: dynamically segmenting the image into a plurality of target regions according to a chrominance component of the image and a preset chrominance interval, the target regions comprising a first region and a second region;
   wherein when the target region is the first region, the step of acquiring a roughness value of a target region in an image and position information of pixels in the target region comprises acquiring a first roughness value of the first region in the image and first position information of pixels in the first region; and
   the step of compensating and updating the first roughness value when the average position information is located in the preset compensation region comprises compensating by multiplying the first roughness value with a first preset compensation coefficient and updating the first roughness value when the average position information is located in the preset compensation region, wherein the first preset compensation coefficient is a constant.

2. The roughness compensation method according to claim 1, wherein the position information of the pixels is determined by a preset coordinate system of the image, the preset coordinate system comprises an X coordinate axis and a Y coordinate axis, the X coordinate axis and the Y coordinate axis are parallel to boundaries of the image respectively, the position information of the pixels is about Y coordinate values of the pixels, and the Y coordinate values of the pixels indicate distances between the pixels and a shooting apparatus.

3. The roughness compensation method according to claim 1, wherein the average position information is an average value of the Y coordinate values of the pixels in the target region, and the preset compensation region is a region far away from the shooting apparatus in the image.

4. The roughness compensation method according to claim 1, wherein the step of dynamically segmenting the image into a plurality of target regions according to a chrominance component of the image and a preset chrominance interval comprises:
   obtaining the chrominance component of the image;
   generating a chrominance component histogram according to the chrominance component;
   determining peaks and troughs in the chrominance component histogram according to the preset chrominance interval and preset peak and trough setting conditions;
   obtaining a segmentation threshold according to the determined peaks and the determined troughs; and
   segmenting the image into the first region and the second region according to the preset chrominance interval and the segmentation threshold, wherein a chrominance value corresponding to one of the first region and the second region is within a range of the segmentation threshold, and a chrominance value corresponding to the other region of the first region and the second region is within a range of the preset chrominance interval and is not within the range of the segmentation threshold.

5. The roughness compensation method according to claim 1, wherein when the target region is the second region, the step of acquiring a roughness value of a target region in an image and position information of pixels in the target region comprises acquiring a second roughness value of the second region in the image and second position information of pixels in the second region; and the step of compensating and updating the roughness value when the average position information is located in the preset compensation region comprises compensating by multiplying the second roughness value with a second preset compensation coefficient and updating the second roughness value when the average position information is located in the preset compensation region, wherein the second preset compensation coefficient is a constant and is different from the first preset compensation coefficient.

6. An image processing device comprising a memory and a processor, the memory storing a computer program, wherein the steps of the roughness compensation method in claim 1 are implemented when the processor executes the computer program.

7. A non-transitory computer readable storage medium, storing a computer program, wherein the steps of the roughness compensation method in claim 1 are implemented when the computer program is executed by a processor.

* * * * *